D. W. PERIN.
REGENERATIVE ELECTRIC MOTOR SYSTEM AND CONTROLLER THEREFOR.
APPLICATION FILED JAN. 3, 1916.

1,215,847.

Patented Feb. 13, 1917.
3 SHEETS—SHEET 2.

Inventor:
Donald W. Perin,
by Roberts Roberts & Cushman
Attys.

Position No. 2.
Starting position

Position No. 3
Armature resistance cut out

Position No. 4.
Shunt field resistance in

Position No. 6.
Shunt field shifted from parallel to series

Position No. 7.
First reverse position

Position No. 8.
Second reverse position

Inventor:
Donald W. Perin,
by Roberts, Roberts & Cushman
Attys.

UNITED STATES PATENT OFFICE.

DONALD W. PERIN, OF NEWTON, MASSACHUSETTS.

REGENERATIVE ELECTRIC-MOTOR SYSTEM AND CONTROLLER THEREFOR.

1,215,847.  Specification of Letters Patent.  Patented Feb. 13, 1917.

Application filed January 3, 1916.  Serial No. 69,802.

*To all whom it may concern:*

Be it known that I, DONALD W. PERIN, a citizen of the United States, and resident of Newton, in the county of Middlesex and State of Massachusetts, have invented new and useful Improvements in Regenerative Electric-Motor Systems and Controllers Therefor, of which the following is a specification.

This invention relates to a regenerative electric motor system and a controller therefor. The invention is adapted for a great variety of purposes, and its application to various uses is within the scope of the invention and is contemplated by the claims; it will, however, be found particularly serviceable for use in electric vehicles, and an embodiment of the invention will be described suitable for electric vehicles, it being understood that the invention is in its broader aspects by no means so limited.

It is among the objects of the invention to reclaim the electrical energy which is ordinarily burned up in brake-bands; to provide means for effectively controlling the speed of the motor; to so organize the electrical controller that all of the moving electrical contacts for effecting the control of the system are carried on one single control member so that the operator, when the system is used in an electrical vehicle, has nothing to attend to in addition to steering and the brakes except a single control member instead of the usual large number of pedals, switches, etc.; to provide a control system which in no position can subject the motor to injury through unskilfulness or inattention in manipulation, in other words, which is "fool proof"; and to secure a more uniform torque, especially in changing speeds of the motor.

These and other features will hereinafter be more fully described and particularly pointed out in the claims.

In the accompanying drawings which illustrate diagrammatically certain embodiments of the invention,—

Figure 1:
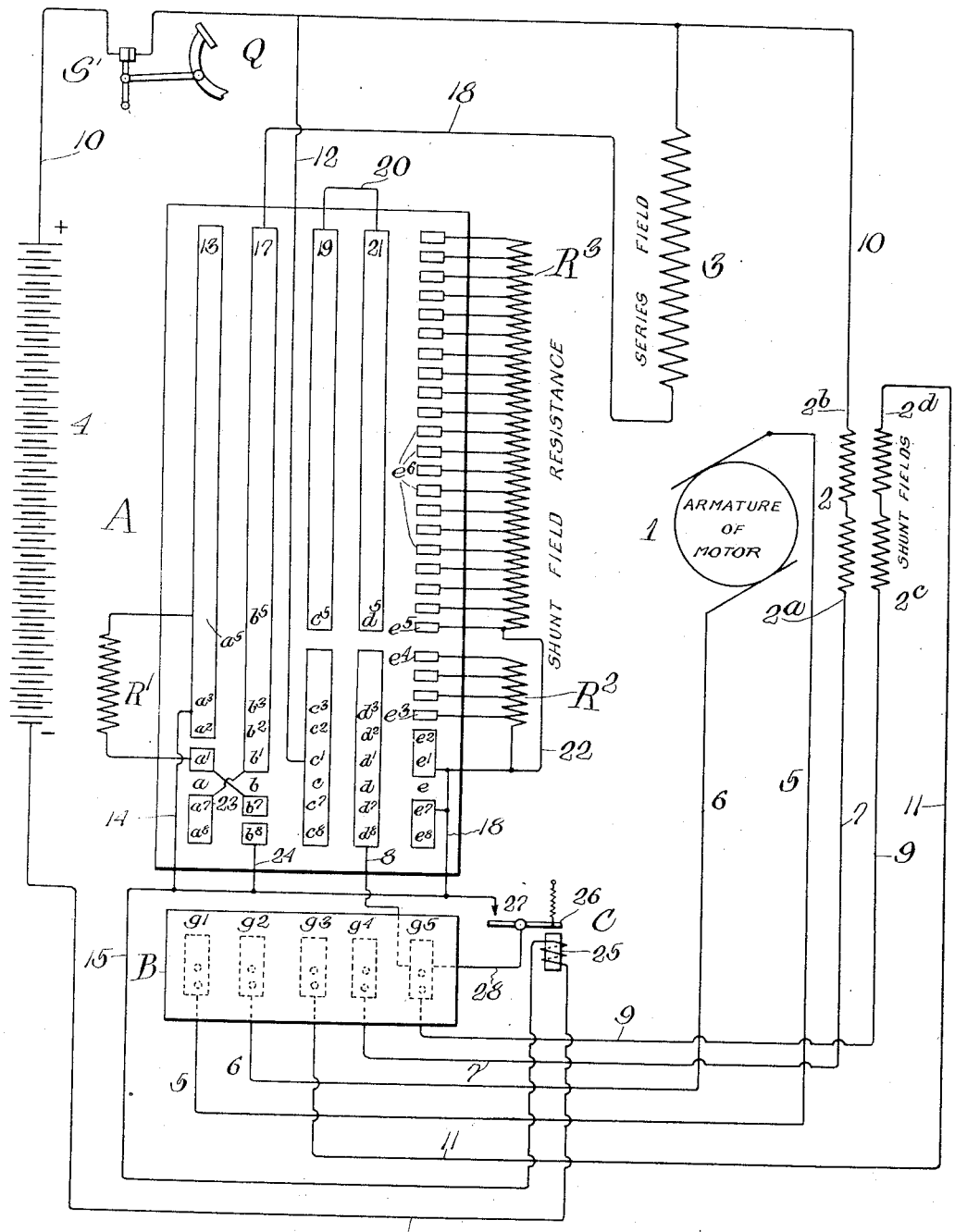
Figure 1 shows in diagram a regenerative electric motor and a controller which may be operated either by hand or electrically.

Referring to the drawings, the main motor is a compound wound motor having an armature 1, a shunt field 2, and a series field 3.

A constitutes one member of the controller and has a group of contacts, the positions of which in relation to each other are fixed. B is the other contact member, and has another group of contacts or fingers fixed with relation to each other and adapted to coöperate with the group of contacts on the control member A, as hereinafter described. Either contact member A or B with its group of contacts may be moved relatively to the other. As herein shown and described, control member B is considered the moving member and control member A the fixed member. The control members A and B, as herein illustrated, consist of flat boards or plates to which their respective contacts are secured, but the form of said control members is not material, as the contacts might be arranged on rotary drums or otherwise mounted.

4 represents the battery or other source of electrical energy.

When the contacts or fingers $g'$ to $g^5$ inclusive on control member B are at the points $a$, $b$, $c$, $d$ and $e$, respectively, on control member A, the controller is in neutral position. Starting in this position, which may be considered position No. 1, the armature leads 5 and 6 from the armature of the main motor will not be connected to any circuit at points $a$ and $b$. The shunt field 2 which consists of two groups of coils is connected from one end $2^a$ through lead 7 to contact finger $g^4$, thence to position $d$ on a contact of the controller group A; thence by lead 8, contact $g^5$ on member B, lead 9 to the end $2^c$ of the other group of shunt field coils. Thus the two groups of shunt field coils are in effect connected to each other across the points $2^a$ and $2^c$. The two groups of shunt field coils are connected at the other ends $2^b$ and $2^d$ to the positive end of battery 4, the end $2^b$ being permanently connected through lead 10, and the end $2^d$ being connected through lead 11, contact finger $g^3$ of the member B, position $c$ on a contact of member A, and lead 12 to the lead 10 running to the positive side of the battery. As the contact $g^5$ touches nothing at position $e$, in the position under consideration there is no current flowing through the shunt fields.

For starting the motor at first speed, the control member B is moved over control member A until contacts $g'$ to $g^5$ occupy positions $a'$ to $e'$ respectively, on control member A. This position may be termed position No. 2, which is the lowest speed or starting position. Armature 1 of the main motor is then connected at one side with the battery through lead 5, contacts $g'$ and $a'$, armature resistance R', contact 13, lead 14, lead 15 through overload relay C (hereinafter described) and lead 16 to the negative end of battery 4. The other side of armature 1 is connected with the battery through lead 6, contact $g^2$, point $b'$ of the contact member 17, lead 18, series field 3 to lead 10, and thence to the positive end of battery 4. Thus the armature is connected to the battery, through the resistance R' and through the series field 3.

The shunt field circuit is the same as already described, excepting that contact $g^5$ touches contact $e'$ on control member A, and thus the shunt field is thrown across the battery with its two groups of coils in parallel, the circuit from $g^5$ being through contact $e'$, lead 18, lead 15, relay C, and lead 16, to the negative side of battery 4.

Figure 3:
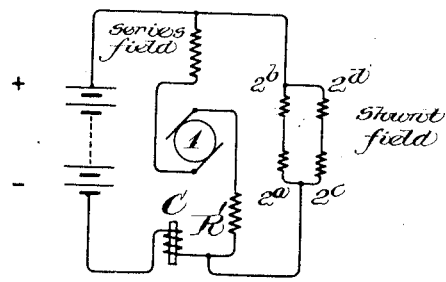
Figs. 3 to 8, inclusive, are simplified diagrams of the circuits established by the controller in its different positions.

In this position the field is saturated at the maximum field strength. The series field is also in circuit with the battery, through the armature, and through the resistance R'. The circuits established by the controller in this position are shown in simplified form in Fig. 3.

Figure 4:
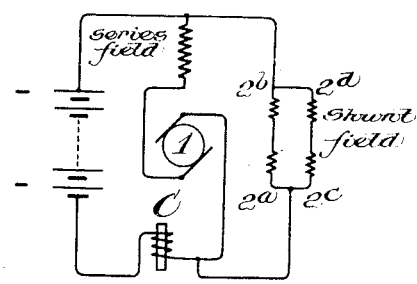

In the next position, as control member B is moved forward over control member A, which may be termed position No. 3, the contacts $g'$ to $g^5$ occupy positions $a^2$ to $e^2$, respectively, and the circuits are the same as in position No. 2 excepting that the resistance R' is cut out of the armature circuit by shifting finger $g'$ to point $a^2$ on contact 13. All the other contacts remain the same, and the circuit from the point $a^2$ on contact 13 is as already described. The circuits established by the controller in this position with the armature resistance cut out are shown in simplified form in Fig. 4.

It is to be understood that there might be intermediate positions between the positions No. 2 and No. 3 at which the resistance R' would be partly cut out or cut out step by step. The circuits would otherwise remain the same. Such provision might be desirable when the system is used for operating heavy trucks or other heavy loads.

Figure 5:
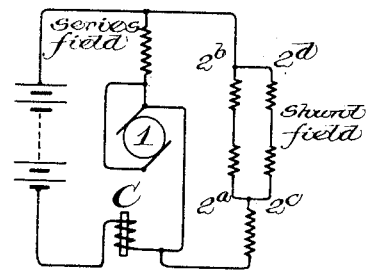

When the control member B is moved to position No. 4 on control member A, the contacts $g'$ to $g^5$ would occupy positions $a^3$ to $e^3$, respectively, on the contacts of group A. The circuits would then be the same as described in position No. 3, excepting that contact $g^5$ touches $e^3$, placing a small part of the resistance R$^2$ in the shunt field circuit between $e^3$ and lead 18. The circuits established by the controller in this position with the shunt field resistance cut in are shown in simplified form in Fig. 5.

As many contacts similar to $e^3$ may be used as desired to cut in step by step more of resistance R$^2$, until a point is reached illustrated at $e^4$, where the whole resistance R$^2$ is in the shunt field circuit. That resistance R$^2$ should be so proportioned that when the resistance is all in circuit with the shunt field, the shunt field is practically of the same strength as would be the shunt field strength if both groups of shunt field coils were in series across the battery with no resistance in circuit. Position $e^4$ or any position between $e^3$ and $e^4$ may be deemed position No. 5.

Figure 6:
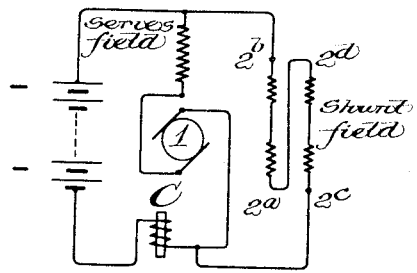

When the control member B is moved forward until contacts $g'$ to $g^5$ occupy positions $a^5$ to $e^5$ respectively, which may be considered as position No. 6, the armature circuit will remain the same as before. The shunt field coils are at this point shifted from parallel to series connection, the shunt field circuits being as follows: from the end $2^a$ of one shunt field coil, by lead 7, contact $g^4$, point $d^5$ of contact 21, lead 20, contact 19, from point $c^5$ of 19 to contact $g^3$, thence by lead 11 to the end $2^d$ of the other shunt field coil, through said coil and from the end $2^c$ of said coil by lead 9 to contacts $g^5$ and $e^5$, thence by lead 22 and lead 18, as before, to the negative side of the battery. At this point, the shunt field coils are in series across the battery with no resistance in circuit. The circuits established by the controller in this position with the shunt field shifted from parallel to series are shown in simplified form in Fig. 6.

The further forward movement of control member B with its group of contacts over the corresponding contacts on control member A will successively cut in more of the shunt field resistances R$^3$ as contact $g^5$ passes over contacts $e^6$, thus speeding up the motor.

The above described connections by which the shunt field coils are first connected in parallel and then in series I believe to produce the most effective and economical system. It would be possible, however, to secure good results by so connecting the shunt field coils that point $2^a$ is permanently connected with point $2^b$, in which case the field coils would be permanently in series. On the other hand, the shunt field coils might be permanently connected in parallel. In either case, one continuous shunt field resistance would be employed instead of the two resistances R$^2$, R$^3$, and the leads 7 and 11 with the fingers $g^4$, and $g^3$ would be omitted, and also all corresponding contacts lying in the columns with 19 and 21. In any case, the shunt field windings should be such that when the contact $g^5$ is at the point where no resistance is in the field circuit (as at $e'$) the fields would be saturated.

Figure 7:
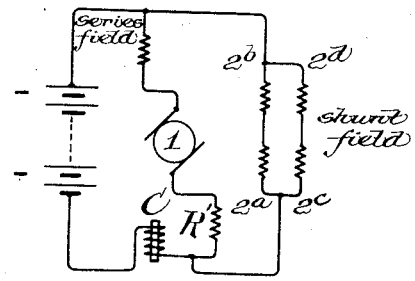

To reverse the motor, the control member B is moved from neutral position backward until contacts $g'$ to $g^5$ touch positions $a^7$ to $e^7$ respectively. This may be termed position No. 7. In this position the electrical connections will be the same as when the contacts on member B touch positions $a'$ to $e'$ of the group A, excepting that the current would be reversed through the armature 1 by means of the cross-over leads 23 from $a'$ to $b^7$, and from $b'$ to $a^7$. This reverses the motor at starting speed. The circuits established by the controller in this position with the armature resistance R' in circuit are shown in simplified form in Fig. 7.

Figure 8:
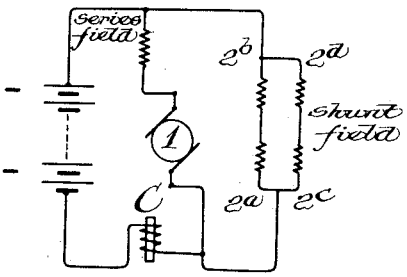

In the next reverse position, which may be termed position No. 8, the contacts on member B touch positions $a^8$ to $e^8$ respectively. As finger $g^2$ now touches $b^8$, it is connected through lead 24 with lead 15, and thence to the negative side of the battery with the resistance R' cut out, the condition being the same as when the fingers $g'$ to $g^5$ are at positions $a^2$ to $e^2$ respectively, excepting that the current is reversed in the armature 1. The circuits established by the controller in this position with the armature resistance cut out are shown in simplified form in Fig. 8.

Referring now to the overload relay C. In case the current in the armature becomes excessive, as when imposing too severe a burden on the motor such as would occur in running an electrical vehicle containing the system uphill at too high a speed, it is desirable automatically to cut out the shunt field resistance, and so slow down the motor. To this end, the overload relay C is provided consisting of an electromagnet 25 and an armature 26. The armature 26 is preferably a permanent magnet, so that it will be attracted only when the current is being drawn from the battery and not when the battery is being charged from the motor, operating as a generator in the manner hereinafter explained. The winding of the electromagnet 25 is in circuit through leads 15 and 16 with the main battery 4 whenever the latter is delivering current to the motor. The relay C is so designed as to operate when a predetermined amount of current is drawn by the motor. Thereupon the armature 26 will be attracted and will close switch 27, thereby connecting contact $g^5$ through lead 28, switch 27, leads 15 and 16, to the negative side of the battery, cutting out all shunt field resistance. This action will occur, whatever may be the position of the finger $g^5$ on the series of contacts in the $e$ column. The immediate effect of thus cutting out the shunt field resistance is to slow down the motor, which effect will continue until the current in relay C drops below the predetermined amount. This will usually occur before the motor has come down to its slowest running speed, corresponding to the speed when the contacts on controller B are at positions $a'$ to $e'$. As soon as the current in relay C drops to the predetermined amount, the armature 26 will be released, thus opening switch 27 and again cutting in the shunt field resistance or so much of it as is included by the position of finger $g^5$ at the time switch 27 opens. This will again tend to increase the speed of the motor until the point is reached where the predetermined amount of current again goes through relay C, whereupon the action above described will be repeated. Thus the action of the overload relay will continue intermittently as occasion requires, thereby maintaining the motor at such speed that it is drawing substantially the predetermined amount of current, and no more. The vibration of the overload relay will also constitute a signal to the operator that his controller member B is advanced too far, that is, that too much resistance is included in the shunt field circuit. He may then move the controller member back to a position where the vibration ceases, that is, to such position that the whole or the necessary part of the shunt field resistance is cut out.

The form of overload relay thus far described and shown in Fig. 1 will be used where the controller member is operated manually. Another type of overload relay will be hereinafter described to be used when the controller is operated by electrical means.

Figure 2:
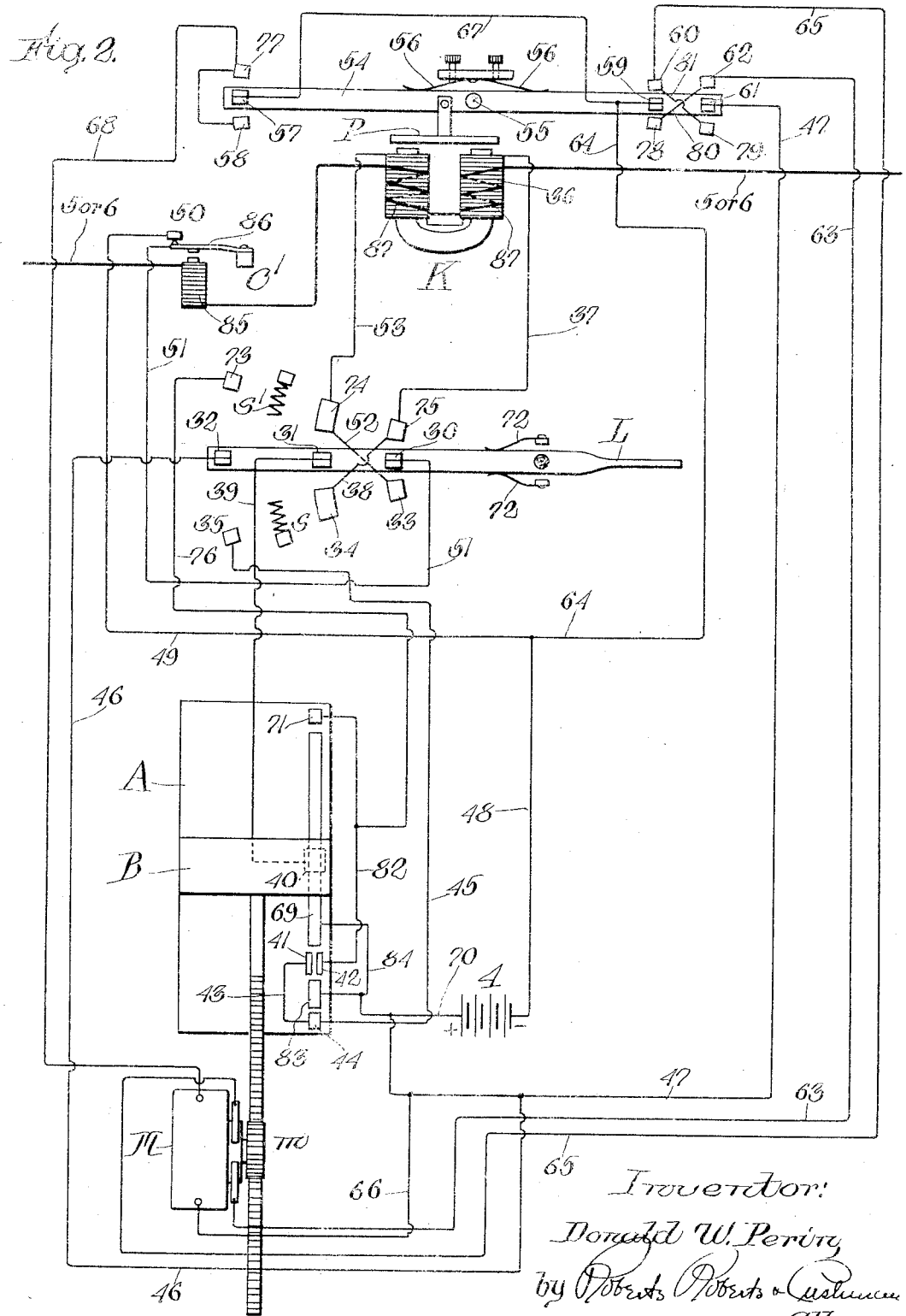
Fig. 2 shows in diagram a system for operating said controller by electrical means.

Under many conditions, as when the controller is used on electric vehicles, it is desirable to place the controller A, B, remote from the seat or station of the operator, thus removing it from a place which might be desired for other purposes, and placing it in a more accessible and more convenient position for repair or inspection. Therefore, instead of a manually operated controller, as shown in Fig. 1, which would have to be placed within the reach of the operator or else connected through a mechanical system of gears or levers, or both, which would be subject to wear and disrepair, I have devised an electrical system for operating the controller as illustrated in Fig. 2.

A and B represent diagrammatically the two relatively movable control members, each with its group of contacts as shown more in detail in Fig. 1. 4 is the battery corresponding to the battery 4 in Fig. 1. In order to move control member B and its contacts over control member A and its contacts, or vice versa, by electrical means, the following devices may be provided:

A control motor M is connected by a rack and pinion $m$ to one of the control members, as herein shown to the member B, so as to slide the member B over the member A. The control motor M is governed by a motor switch, which in turn is actuated by an electromagnet.

L represents a hand lever or switch for governing the control motor M. The hand lever L carries contacts 30, 31 and 32. When the main motor is at rest, with the control member B in neutral position and the hand lever L in central position, as shown in the drawings, the lever contacts 30, 31, 32 are open. To start the main motor with the group of contacts on member B in neutral position on A, the lever L is swung on its pivot until contacts 30, 31, and 32 touch contacts 33, 34, and 35 respectively. This closes a circuit through a shunt winding 36 of the control motor switch magnet K. Said circuit is as follows: from coil 36, through leads 37, 38, contacts 34 and 31, lead 39 to a contact finger 40 on control member B. The contact 40 being in central position, will touch a pair of contacts 41 and 42 on control member A. From contact 41 the circuit is by lead 43 to contact 44, thence by lead 45 to contacts 35 and 32, and thence by leads 46 and 47 to the positive side of the battery 4. From the negative side of the battery, the circuit is by leads 48 and 49 to the narmally closed switch 50, thence by lead 51 to contacts 30 and 33, and thence by leads 52 and 53 to the other end of magnet winding 36.

The closing of the circuit through coil 36 energizes magnet K. P is a permanent magnet, and is the armature of the electromagnet K. The armature P is pivotally secured to the control motor switch 54, which is mounted to rock on a pivot 55, and is normally held in neutral position or open circuit position by a pair of springs 56. When the magnet R is energized by current in coil 36, the armature P will be attracted, swinging the switch 54 until its contact 57 touches contact 58, contact 59 touches contact 60, and contact 61 touches contact 62. This establishes circuits through the armature and field of the control motor M. The armature circuit of the control motor is as follows: Starting at the motor M the circuit is by lead 63, contacts 62 and 61, lead 47 to the positive side of the battery 4. From the negative side of the battery, the circuit is by leads 48 and 64, contacts 59 and 60, and lead 65 to the other side of the armature of motor M.

The field circuit starting from the control motor M is by leads 66 and 47 to the positive end of the battery 4, and from the negative end of the battery, by leads 48, 64 and 67 to contacts 57 and 58, and thence by lead 68 to the other end of the field of motor M.

This starts the control motor M and moves the control member B by means of the rack and pinion connection $m$ to the first running position shown in detail in Fig. 1. Contact 40 is now moved off from contacts 41 and 42, and on to contact 69 carried by control member A.

The lever L has thus far been held against the pressure of a stiff spring $s$ which is now allowed by the operator to push the lever back toward neutral, until contacts 32 and 35 are disconnected, while contacts 31 and 30 still touch 34 and 33. So long as the latter remain in contact, the controller B will continue to move forward, thus speeding up the main motor. Under these conditions, the circuit from the positive side of the battery 4 is by lead 70 to contact 69 on control member A to finger 40 on control member B. Otherwise the circuits of the electrical control remain the same as just described. So long as lever L remains with contacts 30 and 33, and 31 and 34 closed, the control motor M will continue to operate, and the control member B with its group of contacts will continue to move forward until it reaches the highest speed position on member A with the contact fingers $g'$ to $g^4$ on the contacts 13 to 21 respectively (Fig. 1) and contact finger $g^5$ on the last contact $e^6$ with all the shunt field resistance in circuit. When this point is reached, the finger 40 will have moved on to contact 71 on member A, thus breaking the circuit through the shunt winding 36 of magnet K. This releases the armature P and allows the control motor switch 54 to spring back to a neutral position, thereby breaking the circuit through the control motor M, and stopping said motor. The main motor is thus left running at full speed.

At any time during the movement of member B with its group of contacts over the member A, the operator might release the lever L, allowing it to return to neutral position under the influence of springs 72, and the control member B would stop at whatever position it was in at the time, leaving the main motor control circuits in the corresponding position.

Assuming now that the main motor is running at full speed, and that the operator desires to slow the motor down, the lever L is swung in reverse direction until contact 32 touches contact 73, and contacts 31 and 30 touch contacts 74 and 75 respectively. This reverses the current through coil 36 of magnet K, thereby repelling the armature P, which is a permanent magnet, and causing it to operate control motor switch 54 so as to reverse the current through the armature of control motor M, causing it to move the control member B back toward neutral position. The circuits for effecting this action are: from winding 36 of magnet K through lead 37, contacts 75 and 30, lead 51, switch 50, leads 49 and 48 to the negative side of battery 4. From the positive side of battery 4, by leads 47 and 46 to contacts 32 and 73, lead 76 to contact 71 on control member A, contact finger 40 on control member B, lead 39, contacts 31 and 74, and lead 53 to the other end of shunt winding 36. The current in shunt winding 36 is now flowing in reverse direction to that in which it was flowing while control member B was advancing. This causes electromagnet K to repel the permanent magnet armature P, shifting the control motor switch 54 until contact 57 touches contact 77 and contacts 59 and 61 touch contacts 78 and 79 respectively. This reverses the current through the armature of the control motor M, the circuit being as follows: starting at the armature of motor M, the circuit is by leads 63 and 80, contacts 78 and 59, leads 64 and 48, to the negative side of the battery 4; from the positive side of the battery by lead 47, contacts 61 and 79, lead 81, lead 65 to the other side of the armature of motor M.

The field circuit is now from the motor M by leads 66 and 47 to the positive side of the battery; from the negative side of the battery, by leads 48, 64 and 67 to contacts 57 and 77, and thence by lead 68 to the motor.

The current is now reversed through the armature of motor M, which will move control member B toward neutral position. As soon as contact 40 moves off from contact 71 and onto contact 69, the operator may release the lever L sufficiently to allow spring s' to move contact 32 off from contact 73. So long as contacts 31 and 74, and 30 and 75 are in engagement, the motor M will continue to run, and the control member B will continue to move toward neutral. If the lever L is released entirely, and allowed to return to its neutral or central position, the motor M will stop and arrest the control member B, in whatever position it may be at the time.

While control member B is at any intermediate position with contact 40 on contact 69, and contacts 30 and 31 of the control lever L touching contacts 75 and 74, the circuit from the positive side of the battery 4 will be by lead 70, contacts 69 and 40, lead 39 to contact 31. For the rest, the circuit is the same as already described in connection with the first named reversed position of lever L.

If lever L is held in position to keep contacts 31 and 74, and 30 and 75 closed until the control member B returns to neutral position, the contact finger 40 on B will move off from contact 69 and onto contacts 41 and 42, thus breaking circuit through the magnet K and releasing the control motor switch 54, which will return to neutral position and stop the control motor.

To reverse the main motor when control member B is in neutral position, the lever L is operated in the same manner as already described when member B is to be moved from highest speed position toward neutral position, all of the contacts 30, 31 and 32 touching contacts 75, 74 and 73 respectively. The circuits are also the same as before, excepting that the contact 40 touches contact 42 instead of contact 71, 42 being directly connected to 71 by lead 82.

The control motor M then moves the control member B backward until finger 40 touches contact 83. Thereupon, control member B is in the position corresponding to positions $a^7$ to $e^7$ in Fig. 1. The lever L may then be partially released until contact 32 leaves contact 73, while the control motor M will continue to run so long as contacts 31 and 74, and 30 and 75 are closed. The circuits will be the same as already described when contact 40 was moved from contact 71 to contact 69, except that contact 40 is now connected with contact 69 through contact 83 and lead 84. If the lever L is allowed to return to neutral position, the motor M will stop, leaving the control member B wherever it was. If motor M is caused to continue reverse operation, the control member B will continue to move backward until contact 40 moves over contact 83 to contact 44, in which position the contact fingers $g'$ to $g^5$ inclusive will occupy positions $a^8$ to $e^8$ respectively in Fig. 1, which is second reverse speed of the main motor. When the contact 40 moves from contact 83 to contact 44, the circuit through the shunt winding 36 of magnet K will be broken precisely as when contact 40 was moved from contact 69 to neutral, all the circuits being the same, except that contact 83 is connected by lead 84 to contact 69, and contact 44 is connected by lead 43 to contact 41, thus making contacts 83 and 44 correspond electrically to contacts 69 and 41 respectively.

If the operator now desires to make the main motor stop reversing and go to neutral, he switches lever L to the same position as when starting the main motor from neutral to go ahead; that is, contacts 30, 31 and 32 are put into contact with 33, 34 and 35 respectively. This causes the control motor M to move the control member B forward toward neutral position, the circuits being as already described. When contact 40 reaches neutral position touching contacts 41 and 42 (assuming that contacts 32 and 35 are out of contact) the circuit through the shunt field winding 36 of the magnet K will be broken the same as when contact 40 is moved from contact 69 to contact 71, thus stopping the control motor M and the control member B at neutral position.

In order automatically to slow down the main motor in case its armature current becomes excessive an overload relay is provided, which comprises the elements indicated generally at C' and K. The element C' includes an electromagnet 85 in the armature circuit (5 or 6) of the main motor. 86 is the armature of magnet 85, and controls switch 50. The armature circuit (5 or 6) also includes a series winding 87 on magnet K. The relay element C' is so constructed that under normal currents it will remain inoperative, but upon receiving a predetermined amount of current, the magnet 85 will be sufficiently energized to attract armature 86 and open switch 50, thus cutting off all current through lever switch L and rendering the shunt winding 36 on magnet K inoperative. The same predetermined amount of current flowing through series windings 87 on magnet K will repel the permanent magnet armature P, causing the switch 54 to close contacts 57 and 77, 59 and 78, and 61 and 79, so that the motor M will return the control member B toward neutral position until such point is reached that the current in the main motor is again reduced below the predetermined amount, whereupon armature 86 of relay element C' will be released, closing switch 50 and restoring the control of the apparatus to lever L. At the same time, switch 54 will be permitted to return to neutral position and will again be brought under the influence of the control lever L.

The shunt winding 36 is so proportioned to the series winding 87 on magnet K that whenever any amount less than the predetermined amount of current is flowing through series winding 87, even though the direction of said current opposes the direction of shunt winding 36, the shunt winding is strong enough to operate switch 54.

Whether the control system is operated manually (Fig. 1) or by electrical devices for moving the control member B over the control member A as illustrated in Fig. 2, the system will, under certain conditions, charge the battery and at the same time act as an electrical brake. Such conditions exist whenever the load, acting by gravity or momentum, ceases to be driven and becomes the driver; for example, in an electric vehicle, when the vehicle encounters a down grade, or when the control system is brought to a lower speed position than the speed of the vehicle for the time being, the main motor ceases to draw current from the battery, and becomes a generator. For instance, if the control contacts $g'$ to $g^5$ were at positions $a^2$ to $e^2$ or any position above that, and the vehicle encountered a down grade sufficient to drive the vehicle faster than the corresponding speed of the motor, the increased speed of the armature 1 would raise the back electromotive force to a point higher than the electromotive force of the battery, thus causing current to flow back through the battery, charging the same. A similar result would be attained if the vehicle were running at high speed and the control contacts $g'$ to $g^5$ were moved back to low speed position on control member A, in which case the shunt field of the main motor would be strengthened by cutting out the shunt field resistance, thereby raising the electromotive force and charging the battery. The current flowing through the armature in reverse direction when charging the battery opposes the motion of the armature and produces a braking action. This action continues until the motor is brought down to the speed at which it would ordinarily be driven with the controller in the position in which it then stands. This braking action may be made more or less severe by decreasing or increasing the strength of the series field 3 when the apparatus is constructed.

With the above described control system, a compound wound motor is given practically a series characteristic in that the speed of the motor is automatically limited by the amount of current drawn through the armature. At whatever speed the controller is set, the motor will continue to run at the corresponding speed unless an excess of current is drawn, as when ascending a grade too fast, in which case the overload relay will automatically slow down the motor and increase the torque.

As applied to an electric vehicle, some of the advantages of this system are that an increase mileage is obtained per charge of the battery, due to the fact that current may be returned on every down grade and every time the vehicle is brought to a stop; also wear is saved on the brakes since they need be used only to bring the vehicle from low speed to a full stop or to lock the vehicle at a stop; also wear and tear on the whole mechanism of the truck is decreased by limiting the speed of the vehicle when descending a grade.

In order to insure the re-charging and braking effect when going downhill, the main switch S' of the battery circuit may be connected to the emergency brake pedal Q, so that it cannot be opened without throwing on the emergency brake. The main switch S' therefore cannot be held open by the operator when coasting down hill.

Further advantages are also the saving of tires due to the continuous torque obtained with this system in contrast with the torque obtained by the several steps of the ordinary controller, which cause the vehicle to jump forward at each step. Also all speeds of this controller, after the first speed (which includes the armature resistance) are economical running speeds; also a much wider range of control of speed is possible by setting the controller at the proper position for any desired speed than is possible with a series motor, since the speed of a series motor depends on its load, whereas the speed of the present motor is practically independent of the load unless the current drawn exceeds the predetermined safe limit, in which case the overload relay automatically operates. Thus the vehicle can be kept nearer its maximum speed under all conditions of the road than has heretofore been possible. Also the motor and battery are better safeguarded against injury from unskilful or improper operation of the control system, because there is no position of the controller at which damage can be done.

It may be noted also that the series field 3 acts to aid the shunt field 2 when the apparatus is running as a motor, and to oppose the shunt field when operating as a generator. The series field is so proportioned to the shunt field that when a resistance is in the shunt field and the motor is being driven as a generator by gravity or the momentum of the car, the series field opposes the shunt field just enough to counteract the effect of the increased voltage of the battery, the effect of the increase of voltage being to increase the strength of the shunt field. This tends to keep the excitation constant at that speed, and prevents the unstable condition obtained with a plain shunt motor, which, when it starts to generate current, increases the voltage of the battery, and this in turn increases the current in the shunt field, thus raising the voltage still higher. With a shunt motor, this cycle repeats itself until something burns out or the car stops. With my system, this effect is prevented by the proper proportion of the series field to the shunt field.

Again, all of the moving circuit control contacts are carried by a single control member, and are arranged to operate in proper sequence with a series of fixed contacts, requiring no attention or skill on the part of the operator as is usually necessary for governing separate switches, pedals or the like.

I claim:

1. In combination with a motor having an armature and a shunt field, an armature resistance, a shunt field resistance, and a controller comprising a series of fixed contacts connected for rotating the armature in one direction and a series of fixed contacts connected to rotate the armature in reverse direction, and a series of movable contacts all carried by a single control member and moving together as one part, said movable contacts being adapted when the control member is moved in one direction to engage the first series of fixed contacts successively so as first to cut out the armature resistance and then to cut in the shunt field resistance, and when the control member is moved in the opposite direction being adapted to engage the second series of fixed contacts for reversing the armature.

2. In combination with a motor having an armature, a shunt field composed of two groups of coils, and an armature resistance, a controller comprising a series of fixed contacts, and a series of movable contacts, the latter carried by a single control member and moving together as one part, adapted to coöperate with said fixed contacts, and connections between said controller and said motor, whereby the controller will first connect the two groups of shunt field coils in parallel, then cut out the armature resistance while said coils are still in parallel, and then connect said coils in series.

3. In combination with a motor having an armature, a shunt field composed of two groups of coils, and a shunt field resistance, a controller comprising a series of fixed contacts and a series of movable contacts, all the latter carried by a single control member and moving together as one part, adapted to coöperate with said fixed contacts and connections between said controller and said motor whereby the controller will first connect the two groups of shunt field coils in parallel, then cut out the armature resistance while said coils are still in parallel, then cut in field resistance while coils are still in parallel, until the speed of the motor is the same as it would be if the field were in series with no resistance in the field circuit, then connect said coils in series, with no resistance in the field circuit, and then cut in field resistance into circuit with said two coils in series.

4. In combination with a motor having an armature and a shunt field, an armature resistance, a shunt field resistance, and a controller comprising a series of fixed contacts and a series of movable contacts all carried by a single control member and moving together as one part, said movable contacts being adapted to engage the fixed contacts successively so as first to cut out the armature resistance and then to cut in the shunt field resistance, an electric control motor adapted to actuate said control member, a reversing switch adapted to control the current to the control motor and cause the latter to move the control member in either direction, and electrical means for actuating said reversing switch.

5. In combination with a motor, a controller comprising a series of fixed contacts and a series of movable contacts all carried by a single control member and moving together as one part, said movable contacts being adapted to engage the fixed contacts successively, an electric control motor adapted to actuate said control member, a reversing switch adapted to control the current to the control motor and cause the latter to move the control member in either direction, and means automatically to open the control motor circuit when the control member reaches neutral position or either extreme position.

6. In combination with a motor having an armature and a shunt field, an armature resistance, a shunt field resistance, and a controller comprising a series of fixed contacts and a series of movable contacts all carried by a single control member and moving together as one part, said movable contacts being adapted to engage the fixed contacts successively so as first to cut out the armature resistance and then to cut in the shunt field resistance, an electric control motor adapted to actuate said control member, a reversing switch adapted to control the current to the control motor and cause the latter to move the control member in either direction, and means automatically to open the control motor circuit when the control member reaches neutral position or either extreme position.

Signed by me at Boston, Massachusetts, this 30th day of December, 1915.

DONALD W. PERIN.